United States Patent [19]

Riddle et al.

[11] 4,193,468

[45] Mar. 18, 1980

[54] COMBINATION VEHICLE UNDERPAN AND MAINTENANCE PLATFORM

[75] Inventors: Charles F. Riddle, Brookfield, Wis.; Paul E. Ritchey, Madison, Ind.

[73] Assignee: Rexnord Inc., Milwaukee, Wis.

[21] Appl. No.: 936,165

[22] Filed: Aug. 23, 1978

[51] Int. Cl.² ............................................. B62D 25/20
[52] U.S. Cl. ................................. 180/89.17; 180/69.1
[58] Field of Search .................. 296/38, 25; 180/69.1, 180/89.17

[56] References Cited

U.S. PATENT DOCUMENTS

| 1,213,848 | 1/1917 | Edgington | 180/69.1 |
| 1,396,856 | 11/1921 | Leonard | 180/89.17 |
| 3,815,702 | 6/1974 | Paananen | 180/69.1 |

*Primary Examiner*—Philip Goodman

[57] ABSTRACT

A landfill or trash compaction machine has an enclosure which includes an upper removable housing and a lower removable underpan. Power means is provided for lowering the underpan to the ground and for returning it to and holding it in its normal position. When lowered, the underpan provides access to the interior of the machine from below and serves as a platform on which the servicing mechanic may stand within the machine.

6 Claims, 7 Drawing Figures

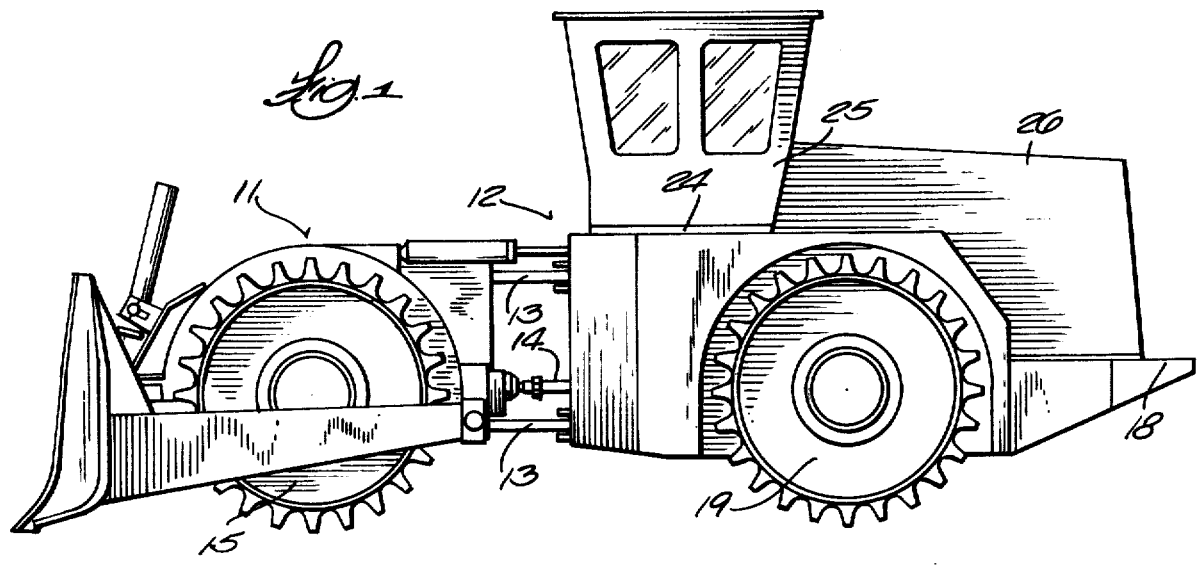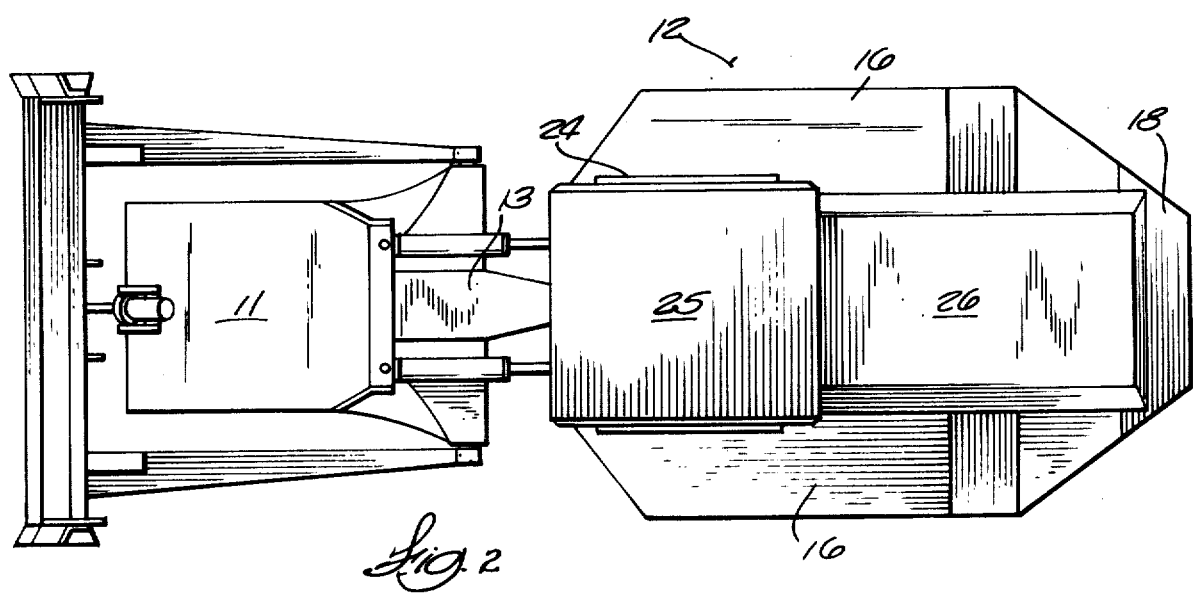

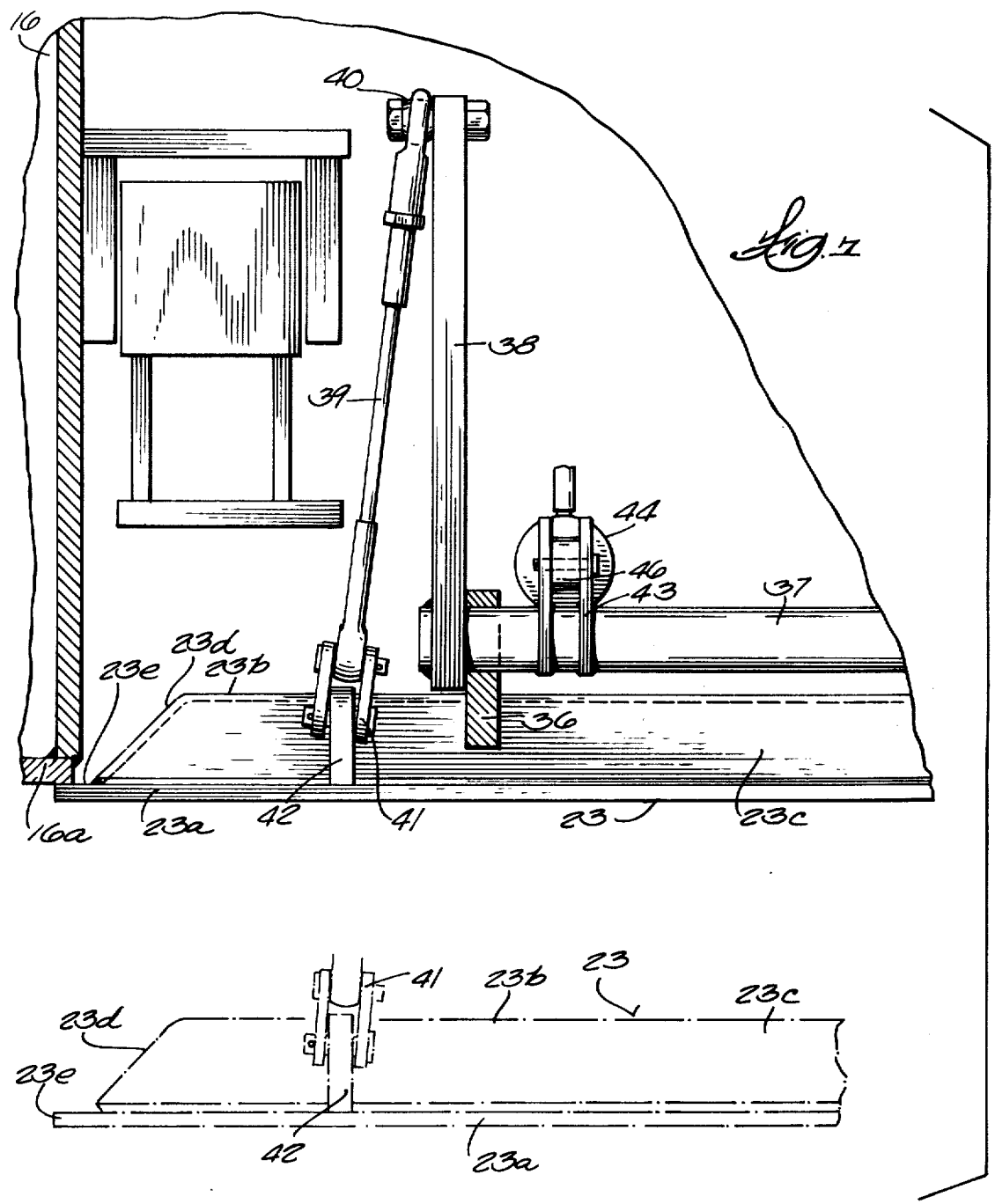

COMBINATION VEHICLE UNDERPAN AND MAINTENANCE PLATFORM

BACKGROUND OF THE INVENTION

The landfill or trash compaction machine for which the present invention was developed is a relatively large machine which is equipped to traverse and spread the dumped materials and crush and compact the same. (As such, it is a machine rather than a vehicle.) One of the requirements of such a machine is that it be essentially totally enclosed. In operation, the enclosure must preclude the entry of the materials and entanglement with wiry trash and the like. When not in operation the vehicle must be enclosed, for example to prevent the entry of rats which will otherwise infest the machine as when left standing overnight. For the required enclosure of the machine a number of lower plates in sizes which can be individually handled have been provided in the past. Narrow plates which are hinged and hang downwardly in the open position have also been provided. The present invention replaces these several plates.

SUMMARY OF THE INVENTION

The present invention provides in a landfill or trash compaction machine a single, relatively large flat protective underpan with power means for lowering the same to the ground where it then serves as a platform on which a person may lie while below the machine or on which he may stand within the machine for servicing the same. The power means is also operable to lift the underpan to and hold it in its normal position enclosing the underside of the machine.

BRIEF DESCRIPTION OF THE DRAWINGS

FIG. 1 is a side elevation of the trash compaction machine for operation over a landfill site.

FIG. 2 is a plan view of the machine shown in FIG. 1.

FIG. 7 is an enlarged front elevation of the right front corner of the underpan.

DESCRIPTION OF THE INVENTION

Figure 3:
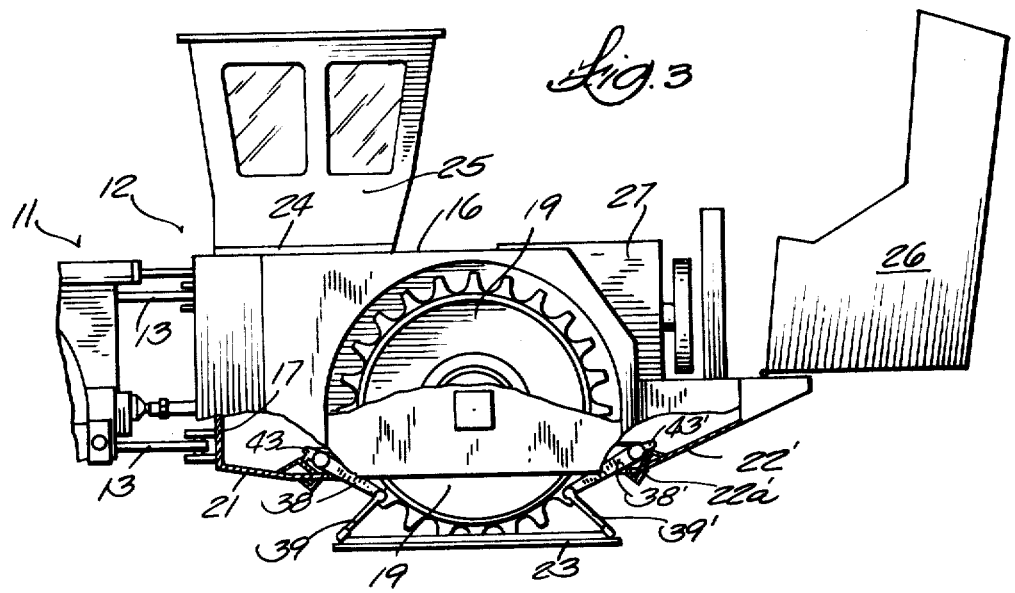
FIG. 3 is a side elevation of the main section of the machine with the underpan lowered and the engine cover swung away for access to the engine, transmission and rear axle. One of the wheels and portions of the frame are broken away to show the underpan in its lowered position.
Figure 4:
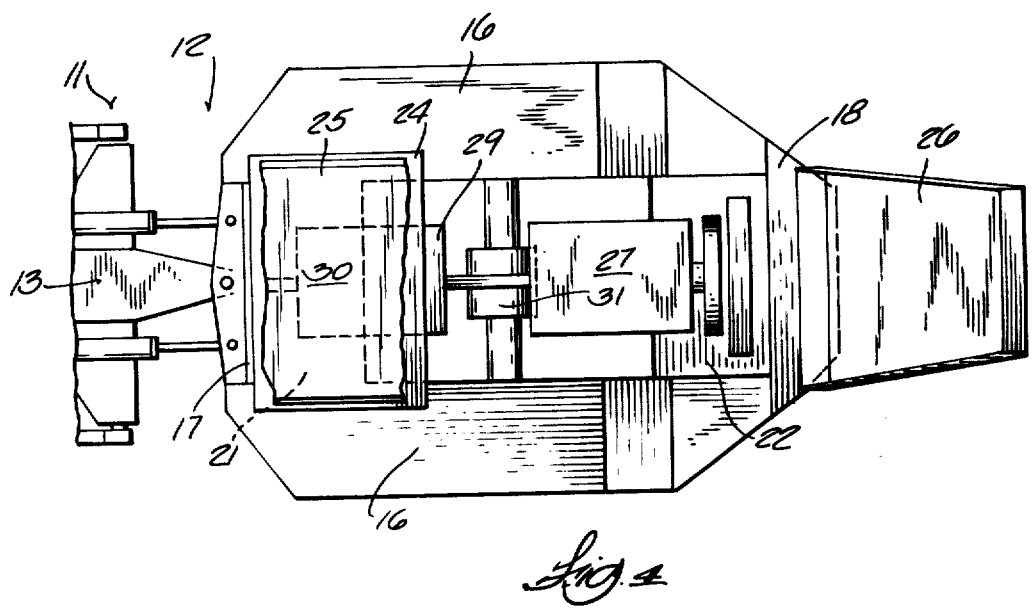
FIG. 4 is a plan view of the main section of the machine shown in FIG. 3. The front and rear portions of the operator's cab are broken away to show other parts of the machine.

The machine shown in full in FIGS. 1 and 2 includes the forward frame 11 and the rear main frame 12. The upper and lower arms 13 of the forward frame are joined to rear frame 12 by pins for pivotal movement of the two frames and steering of the machine. The drive line 14 extends forwardly from the rear frame 12 between arms 13 and is connected to the forward drive shaft, not shown, which differentially drives the two forward wheels 15, of which one is shown. As shown, frame 11 includes fender portions which partially enclose wheels 15.

The rear frame 12 includes the two spaced side members 16. They are joined by the rigid front plate 17 and at the rear by cross-member 18. The forward portion of each side member 16 comprises a tank for fuel and hydraulic oil and each rear portion forms a fender which partially encloses a rear wheel 19.

The underside of frame 12 between members 16 is closed by skid plates 21 and 22 and the intermediate underpan 23. The forward skid plate 21 extends rearwardly from front plate 17 and the rear skid plate 18 extends rearwardly from underpan 23 to the rear cross-member 18.

The interior forward portion of frame 12 between members 16 is closed at the top by the plate 24 which spans the space between members 16 and supports the operator's cab 25. The housing 26 extending rearwardly from cab 25 normally closes over the rear portion of frame 12 and encloses the engine 27. The lower rear end of housing 26 is pivotally connected to the rear cross-member 18 whereby housing 26 is readily swung upwardly and rearwardly for access to engine 26 and for downward entry into the interior of frame 12. Such entry provides access to the engine gear case 29, the transfer case 30, the rear axle 31 and all the accessory equipment of the machine within frame 12, that is, between members 16.

The underpan 23 which extends below rear axle 31 as required is removable also for such access to the interior of the machine. According to the present invention, the underpan is a single rigid structure and power means is provided, as required therefor, for lowering the same to the ground where it serves as a platform. The same power means is operable to raise it to and lock it in its normal position.

Figure 6:
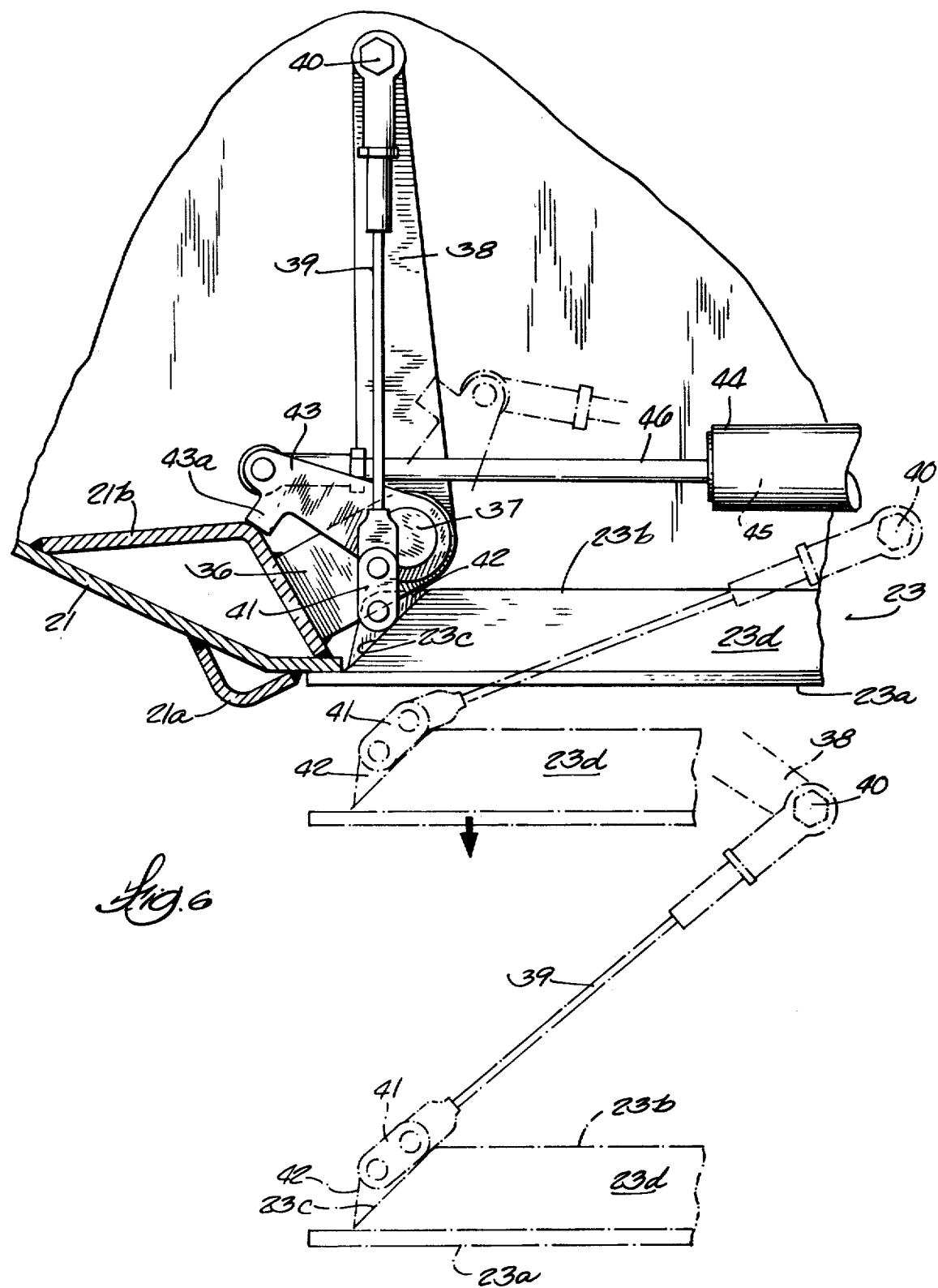
FIG. 6 is an enlarged side elevation of the left front corner of the underpan and the mechanism in part.

Underpan 23 includes a lower plate 23a and an upper plate 23b. The four inclined margins 23c and 23d of plate 23b are welded to lower plate 23a which uniformly projects therefrom to form a surrounding ledge 23e. Plates 23a and b and intermediate spacers, not shown, are joined to form a rigid structure. Plate 23b fits between the lower plates 16a defining the undersides of members 16 and similarly fits between plates 21 and 22 with the ledge 23c extending beneath members 16 and plates 21 and 22. In raising underpan 23 as will be described, margins 23c and 23d guide the underpan into its closed position. As shown in FIG. 6, skid plate 21 includes a downwardly projecting protective strip 23a which prevents any projecting material from being driven into any gap between the ledge and the plate. Rear plate 22 is suitably provided with a similar protective strip 22a.

Describing now only the support of the front end of underpan 23, the rear edge of the forward skid plate 21 is reinforced by the V-shaped member 21b from which the two shaft bearing supports 36 project. Each end of shaft 37 which is journalled in supports 36 carries a lever arm 38. A cable 39 of adjustable length hangs from a ball joint 40 carried by the upper or outer end of each lever arm 36. The lower end of each cable 39 is connected by link 41 with a bracket 42 fixed to underpan 23. More specifically, two such brackets 42 are fixed to margin 23c and near the front corners of underpan 23. Between shaft bearings 36, shaft 37 is provided with the lever crank 43 which is operated by the hydraulic actuator comprising the cylinder 44, piston 45 and piston rod 46. The closed end of cylinder 44 is carried by the stationary bracket 47 which is a part of frame 12 of the machine. The end of rod 46 is connected to lever crank 43 and hydraulic fluid under pressure delivered to the closed end of cylinder 44 raises the front end of underpan 23. The abutment 43a projecting from crank 43 and its engagement with member 21b limits the rotation of shaft 37 in raising the underpan to its locked position. Hydraulic pressure delivered to the other end of cylinder 44 lowers the front end of underpan 23.

In lowering underpan 23, from their locked position lever arms 38 rotate about 5° to a position where cables 39 pass the ends of shafts 37 and about an additional 65° to their lowermost position. As cables pass the ends of shafts 37, in raising underpan 23, the ledge 23e tightly engages the plates defining the underside of the frame 12.

The rear end of underpan 23 is secured, raised and lowered by an identical mechanism, the parts of which are identified by similar characters. The shaft 37' of the rear mechanism is supported by shaft bearings 36' which project from the upper V-shaped member 22b of skid plate 22. The cables 39' of the rear mechanism are connected to brackets which project from the inclined margin at the rear of the underpan 23. The closed end of cylinder 44' is carried by the stationary bracket 47' which is a part of frame 12 of the machine. The rod 46' is connected to crank 43'.

Figure 5:
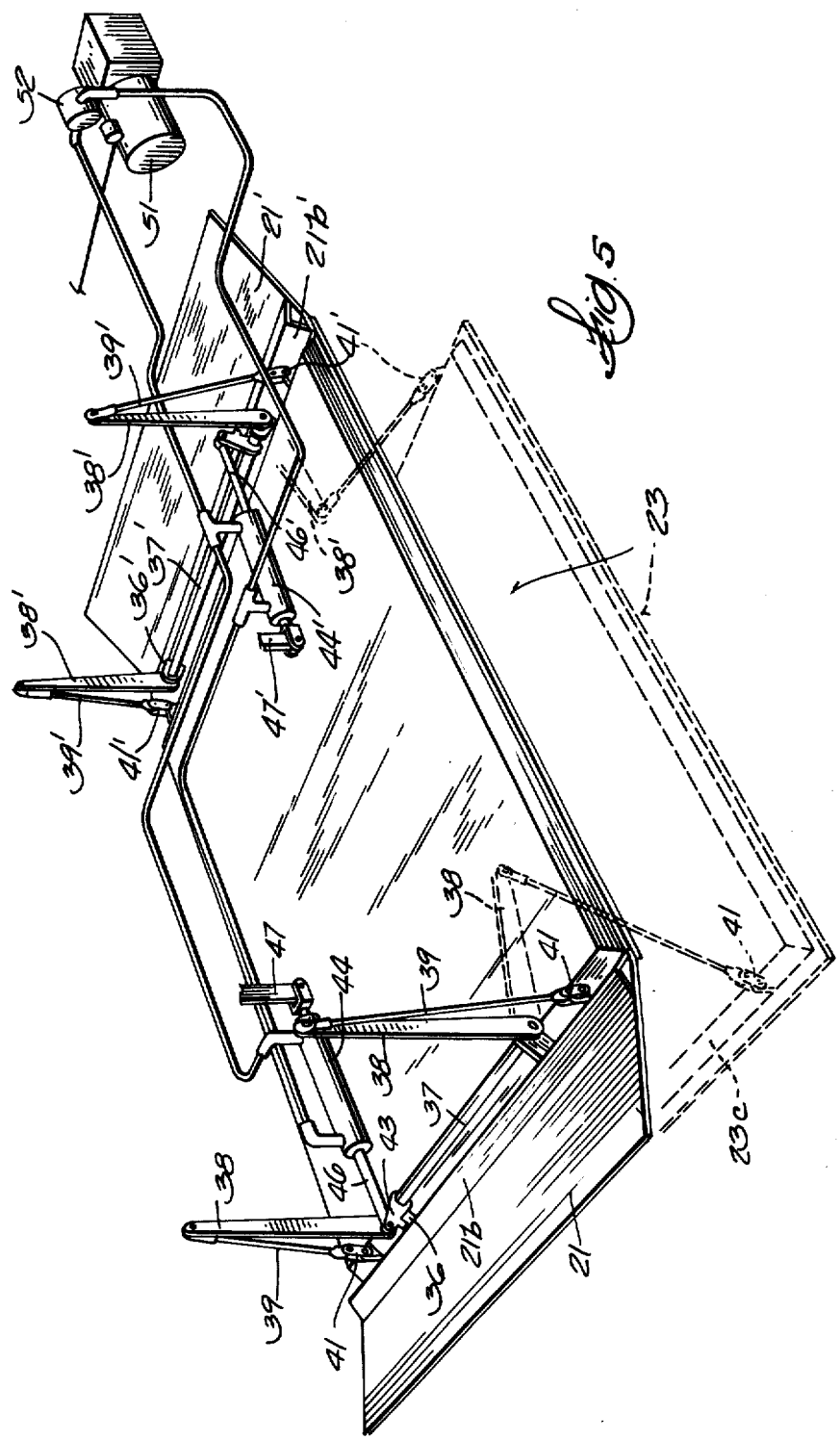
FIG. 5 is a perspective view of parts of the frame of the main section of the machine and shows the mechanism for raising and lowering the underpan.

With reference to FIG. 5, the hydraulic power means for raising and lowering underpan 23 includes the motor 51 which is connected to the machine's electrical system and drives pump 52 in either direction. Lines connect pump 52 to the closed ends of the two hydraulic cylinders 44 and 44' to lower underpan 23 and other lines connect pump 52 to the rod ends of the cylinders to raise underpan 23.

Cables 39 and 39' are flexible and of a length which allows underpan 23 to rest on uneven ground when lowered. In the machine shown, the underpan 23 lowers to over eighteen inches (45 cm.) from its upper locked position and thus provides some access to the underside of the machine. However, removal of housing 26 as shown, allows the mechanic to climb down into the machine. With underpan 23 lowered as described, the mechanic may readily stand in the considerable free space which is afforded in a machine of this type. That is, the mechanic does not have to risk standing on the material of the landfill site. The upper side of underpan 23 is entirely smooth for easily first wiping clean of oil, such as from engine 27. The underpan also has no injurious or annoying projections and parts or tools which might be dropped and lost in the trash, instead land on the underpan and are readily retrieved.

When maintenance or repairs are completed, hydraulic fluid under pressure from pump 52 is delivered to the closed ends of the cylinders so that the cables pull underpan 23 upward to its closed and locked position. Hydraulic pressure is, of course, not required to hold the underpan in its closed and locked position, or in its lowered position.

We claim:

1. A relatively large, self-propelled machine including a frame having lower plates which define an opening for access to and entry into the interior of the frame from the underside thereof for servicing the operating components of the machine positioned in said interior, an underpan which is selectively movable vertically to upper and lower positions respecting the frame, in the upper position the underpan being disposed to close said opening and being essentially flush with said plates for sliding over projecting objects over which the machine passes, and actuating means positioned within the interior of said frame and supported thereby and connected to said underpan for raising and locking the underpan in the described upper position and for lowering the underpan to a lower position where it may lie on the ground beneath the machine and where being spaced below the frame it provides entry to the interior of the frame through said opening, said underpan having upper edges which are smoothly rounded so as to present no sharp edges to the mechanic in making such entry and a top side which is smooth and may be readily wiped clear of oil and debris by the mechanic in making such entry, the top side of said underpan being flat and when spaced below the frame such that it serves as a platform on which a mechanic may lie or stand while servicing the operating components of the machine positioned therein.

2. The machine of claim 1 which is equipped to traverse and compact the material of a landfill site.

3. The machine of claim 1 wherein the power means includes levers extending from parallel shafts, links connecting the ends of said levers and said underpan, the respective links and levers having upper dead-center positions, and hydraulic cylinders connected to said shafts to rotate the levers through similar arcs which respectively extend past said dead-center positions where the underpan is locked in said upper position.

4. A relatively large self-propelled machine including a frame having lower plates which define an opening for access to and entry into the interior of the frame from the underside thereof for servicing the operating components of the machine positioned in said interior, an underpan having upper and lower portions and being selectively movable vertically to upper and lower positions respecting the frame, in the upper position the upper portion fitting within said opening and the lower portion extending below and engaging the margins of said plates defining said opening so as to be essentially flush with said plates for sliding over projecting objects over which the machine passes, and power means positioned within the interior of said frame and supported thereby and connected to said underpan for raising and locking the underpan in the described upper position and for lowering the underpan to a lower position where it may lie on the ground beneath the machine and where being spaced below the frame it provides entry to the interior of the frame through said opening, the upper portions of said underpan having inclined margins which provide its guidance upwardly into said opening and a top side which is smooth and self-draining and which may be readily wiped clear of oil and debris by the mechanic in making such entry and when spaced below the frame such that it serves as a platform on which a mechanic may lie or stand while servicing the operating components of the machine positioned therein.

5. The machine of claim 1 wherein the actuating means includes flexible tension elements having their lower ends connected to the underpan at the margins thereof and such that the underpan may lie flat on the ground and at an incline, within limits, relative to the machine.

6. The machine of claim 3 wherein said links comprise flexible tension elements having their lower ends connected to the underpan at the margins thereof and such that the underpan may lie flat on the ground and at an incline, within limits, relative to the machine.

* * * * *